United States Patent
Wilkins et al.

(10) Patent No.: US 9,268,499 B1
(45) Date of Patent: Feb. 23, 2016

(54) HYBRID DRIVE MIGRATING HIGH WORKLOAD DATA FROM DISK TO NON-VOLATILE SEMICONDUCTOR MEMORY

(75) Inventors: Virgil V. Wilkins, Perris, CA (US); Robert M. Fallone, Newport Beach, CA (US); Alan T. Meyer, Anaheim Hills, CA (US); William B. Boyle, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 356 days.

(21) Appl. No.: 13/157,111

(22) Filed: Jun. 9, 2011

Related U.S. Application Data

(60) Provisional application No. 61/373,729, filed on Aug. 13, 2010.

(51) Int. Cl.
*G06F 3/06* (2006.01)

(52) U.S. Cl.
CPC .............. *G06F 3/068* (2013.01); *G06F 3/0613* (2013.01); *G06F 3/0659* (2013.01); *G06F 2212/217* (2013.01)

(58) Field of Classification Search
None
See application file for complete search history.

(56) References Cited

U.S. PATENT DOCUMENTS

| | | | |
|---|---|---|---|
| 5,333,138 A | 7/1994 | Richards et al. |
| 5,420,998 A | 5/1995 | Horning |
| 5,457,786 A | 10/1995 | Roush |
| 5,471,604 A | 11/1995 | Hasbun et al. |
| 5,581,785 A | 12/1996 | Nakamura et al. |
| 5,586,291 A | 12/1996 | Lasker et al. |
| 5,636,355 A | 6/1997 | Ramakrishnan et al. |
| 5,682,273 A | 10/1997 | Hetzler |
| 5,905,901 A | 5/1999 | Klein |
| 5,913,067 A | 6/1999 | Klein |
| 5,954,820 A | 9/1999 | Hetzler |
| 6,018,789 A | 1/2000 | Sokolov et al. |
| 6,044,439 A | 3/2000 | Ballard et al. |
| 6,065,095 A | 5/2000 | Sokolov et al. |
| 6,078,452 A | 6/2000 | Kittilson et al. |
| 6,081,447 A | 6/2000 | Lofgren et al. |
| 6,092,149 A | 7/2000 | Hicken et al. |
| 6,092,150 A | 7/2000 | Sokolov et al. |
| 6,094,707 A | 7/2000 | Sokolov et al. |
| 6,105,104 A | 8/2000 | Guttmann et al. |
| 6,111,717 A | 8/2000 | Cloke et al. |
| 6,115,200 A | 9/2000 | Allen et al. |
| 6,145,052 A | 11/2000 | Howe et al. |
| 6,175,893 B1 | 1/2001 | D'Souza et al. |
| 6,178,056 B1 | 1/2001 | Cloke et al. |
| 6,191,909 B1 | 2/2001 | Cloke et al. |

(Continued)

OTHER PUBLICATIONS

DongKyu Lee; Koh, K.; , "PDC-NH: Popular data concentration on NAND flash and hard disk drive," Grid Computing, 2009 10th IEEE/ACM International Conference on , vol., no., pp. 196-200, Oct. 13-15, 2009.*

(Continued)

*Primary Examiner* — Edward Dudek, Jr.
*Assistant Examiner* — Ralph A Verderamo, III

(57) ABSTRACT

A hybrid drive is disclosed comprising a head actuated over a disk, and a non-volatile semiconductor memory (NVSM). Access commands are received from a host including disk read commands. When a high workload of disk access commands is detected, data of at least one disk read command is migrated to the NVSM.

16 Claims, 4 Drawing Sheets

(56) References Cited

U.S. PATENT DOCUMENTS

| | | |
|---|---|---|
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,236,527 B1 | 5/2001 | Uchiike et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,275,949 B1 | 8/2001 | Watanabe |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,295,577 B1 | 9/2001 | Anderson et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,429,990 B2 | 8/2002 | Serrano et al. |
| 6,437,935 B1 | 8/2002 | Johnson et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,614,616 B1 | 9/2003 | Michel et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,662,267 B2 | 12/2003 | Stewart |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,725,397 B1 | 4/2004 | Emberty et al. |
| 6,732,241 B2 | 5/2004 | Riedel |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,754,021 B2 | 6/2004 | Kisaka et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,798,599 B2 | 9/2004 | Dykes et al. |
| 6,799,274 B1 | 9/2004 | Hamlin |
| 6,807,630 B2 | 10/2004 | Lay et al. |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,845,456 B1 | 1/2005 | Menezes et al. |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,909,574 B2 | 6/2005 | Aikawa et al. |
| 6,910,099 B1 | 6/2005 | Wang et al. |
| 6,928,470 B1 | 8/2005 | Hamlin |
| 6,928,518 B2 | 8/2005 | Talagala |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |

(56) References Cited

U.S. PATENT DOCUMENTS

| | | |
|---|---|---|
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,620 B2 | 2/2006 | Avraham et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,017,037 B2 | 3/2006 | Fortin et al. |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,076,605 B1 | 7/2006 | Son |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,107,444 B2 | 9/2006 | Fortin et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,139,933 B2 | 11/2006 | Hsu et al. |
| 7,142,385 B2 | 11/2006 | Shimotono et al. |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,206,948 B2 | 4/2007 | Brauer |
| 7,215,496 B1 | 5/2007 | Kupferman et al. |
| 7,215,771 B1 | 5/2007 | Hamlin |
| 7,231,198 B2 | 6/2007 | Loughran |
| 7,237,054 B1 | 6/2007 | Cain et al. |
| 7,240,161 B1 | 7/2007 | Boyle |
| 7,249,365 B1 | 7/2007 | Price et al. |
| 7,254,721 B2 | 8/2007 | Tobias et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,275,166 B2 | 9/2007 | Kaiju et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,334,082 B2 | 2/2008 | Grover et al. |
| 7,340,647 B2 | 3/2008 | Aasheim et al. |
| 7,346,790 B1 | 3/2008 | Klein |
| 7,350,105 B2 | 3/2008 | Aasheim et al. |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,395,452 B2 | 7/2008 | Nicholson et al. |
| 7,404,013 B1 | 7/2008 | Masiewicz |
| 7,406,545 B1 | 7/2008 | Rothberg et al. |
| 7,411,757 B2 | 8/2008 | Chu et al. |
| 7,415,571 B1 | 8/2008 | Hanan |
| 7,421,552 B2 | 9/2008 | Long |
| 7,425,810 B2 | 9/2008 | Hobbet et al. |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,461,202 B2 | 12/2008 | Forrer, Jr. et al. |
| 7,468,854 B2 | 12/2008 | Yamashita et al. |
| 7,471,483 B1 | 12/2008 | Ferris et al. |
| 7,471,486 B1 | 12/2008 | Coker et al. |
| 7,472,222 B2 | 12/2008 | Auerbach et al. |
| 7,477,477 B2 | 1/2009 | Maruchi et al. |
| 7,483,234 B2 | 1/2009 | Shimozato |
| 7,486,060 B1 | 2/2009 | Bennett |
| 7,496,493 B1 | 2/2009 | Stevens |
| 7,509,471 B2 | 3/2009 | Gorobets |
| 7,516,346 B2 | 4/2009 | Pinheiro et al. |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,552,347 B2 | 6/2009 | Schutte |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,610,438 B2 | 10/2009 | Lee et al. |
| 7,610,445 B1 | 10/2009 | Manus et al. |
| 7,613,876 B2 | 11/2009 | Bruce et al. |
| 7,619,841 B1 | 11/2009 | Kupferman |
| 7,620,773 B2 | 11/2009 | Nicholson et al. |
| 7,644,231 B2 | 1/2010 | Recio et al. |
| 7,647,513 B2 | 1/2010 | Tobias et al. |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,685,360 B1 | 3/2010 | Brunnett et al. |
| 7,688,540 B1 | 3/2010 | Mei et al. |
| 7,698,586 B2 | 4/2010 | Kim et al. |
| 7,719,785 B2 | 5/2010 | Taniguchi et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,752,491 B1 | 7/2010 | Liikanen et al. |

(56) References Cited

U.S. PATENT DOCUMENTS

| | | |
|---|---|---|
| 7,760,458 B1 | 7/2010 | Trinh |
| 7,768,776 B1 | 8/2010 | Szeremeta et al. |
| 7,774,556 B2 | 8/2010 | Karamcheti et al. |
| 7,797,487 B2 | 9/2010 | Lubbers et al. |
| 7,804,657 B1 | 9/2010 | Hogg et al. |
| 7,813,954 B1 | 10/2010 | Price et al. |
| 7,817,372 B2 | 10/2010 | Takahashi |
| 7,827,320 B1 | 11/2010 | Stevens |
| 7,835,104 B2 | 11/2010 | Yamashita et al. |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,890,696 B2 | 2/2011 | Lawson |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,984,259 B1 | 7/2011 | English |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,060,707 B2 | 11/2011 | Fairhurst et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,098,451 B2 | 1/2012 | Graef |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,307 B2 | 3/2012 | Kim et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,169,726 B2 | 5/2012 | Wilson |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,244,975 B2 | 8/2012 | DeCenzo |
| 8,245,003 B2 * | 8/2012 | Suzuki et al. ............ 711/165 |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,286,018 B2 | 10/2012 | Chang et al. |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,341,339 B1 | 12/2012 | Boyle et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,644 B2 | 12/2013 | Kumasawa et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |

(56) References Cited

U.S. PATENT DOCUMENTS

| | | | |
|---|---|---|---|
| 8,699,159 B1 | 4/2014 | Malina | |
| 8,699,171 B1 | 4/2014 | Boyle | |
| 8,699,172 B1 | 4/2014 | Gunderson et al. | |
| 8,699,175 B1 | 4/2014 | Olds et al. | |
| 8,699,185 B1 | 4/2014 | Teh et al. | |
| 8,700,850 B1 | 4/2014 | Lalouette | |
| 8,719,501 B2 | 5/2014 | Flynn et al. | |
| 8,743,502 B1 | 6/2014 | Bonke et al. | |
| 8,749,910 B1 | 6/2014 | Dang et al. | |
| 8,751,699 B1 | 6/2014 | Tsai et al. | |
| 8,755,141 B1 | 6/2014 | Dang | |
| 8,755,143 B2 | 6/2014 | Wilson et al. | |
| 8,756,361 B1 | 6/2014 | Pruett et al. | |
| 8,756,382 B1 | 6/2014 | Carlson et al. | |
| 8,769,593 B1 | 7/2014 | Elliott et al. | |
| 8,773,802 B1 | 7/2014 | Anderson et al. | |
| 8,775,720 B1 | 7/2014 | Meyer et al. | |
| 8,780,478 B1 | 7/2014 | Huynh et al. | |
| 8,782,334 B1 | 7/2014 | Boyle et al. | |
| 8,793,532 B1 | 7/2014 | Tsai et al. | |
| 8,797,669 B1 | 8/2014 | Burton et al. | |
| 8,799,977 B1 | 8/2014 | Kapner, III et al. | |
| 8,819,375 B1 | 8/2014 | Pruett et al. | |
| 8,825,976 B1 | 9/2014 | Jones | |
| 8,825,977 B1 | 9/2014 | Syu et al. | |
| 2002/0083264 A1* | 6/2002 | Coulson | 711/112 |
| 2003/0140198 A1 | 7/2003 | Ninose et al. | |
| 2003/0145167 A1 | 7/2003 | Tomita | |
| 2005/0108473 A1 | 5/2005 | Le Moal et al. | |
| 2005/0120251 A1 | 6/2005 | Fukumori | |
| 2006/0075185 A1 | 4/2006 | Azzarito et al. | |
| 2006/0195657 A1 | 8/2006 | Tien et al. | |
| 2007/0006021 A1 | 1/2007 | Nicholson et al. | |
| 2007/0050540 A1 | 3/2007 | Klein | |
| 2007/0162693 A1 | 7/2007 | Nam | |
| 2008/0024899 A1 | 1/2008 | Chu et al. | |
| 2008/0040537 A1 | 2/2008 | Kim | |
| 2008/0049354 A1 | 2/2008 | Nitta | |
| 2008/0059694 A1* | 3/2008 | Lee | 711/103 |
| 2008/0130156 A1 | 6/2008 | Chu et al. | |
| 2008/0177938 A1 | 7/2008 | Yu | |
| 2008/0222353 A1 | 9/2008 | Nam et al. | |
| 2008/0256287 A1 | 10/2008 | Lee et al. | |
| 2008/0288714 A1* | 11/2008 | Salomon et al. | 711/103 |
| 2008/0307270 A1 | 12/2008 | Li | |
| 2009/0019218 A1 | 1/2009 | Sinclair et al. | |
| 2009/0024793 A1 | 1/2009 | Fontenot et al. | |
| 2009/0031072 A1 | 1/2009 | Sartore | |
| 2009/0089501 A1 | 4/2009 | Ahn et al. | |
| 2009/0103203 A1 | 4/2009 | Yoshida | |
| 2009/0106518 A1 | 4/2009 | Dow | |
| 2009/0113702 A1 | 5/2009 | Hogg | |
| 2009/0144501 A2 | 6/2009 | Yim et al. | |
| 2009/0150599 A1 | 6/2009 | Bennett | |
| 2009/0172249 A1* | 7/2009 | Matthews | 711/103 |
| 2009/0172324 A1 | 7/2009 | Han et al. | |
| 2009/0172499 A1 | 7/2009 | Olbrich et al. | |
| 2009/0198940 A1* | 8/2009 | Ash et al. | 711/165 |
| 2009/0213486 A1 | 8/2009 | Takahashi | |
| 2009/0249168 A1 | 10/2009 | Inoue | |
| 2009/0271562 A1 | 10/2009 | Sinclair | |
| 2009/0327603 A1 | 12/2009 | McKean et al. | |
| 2010/0067138 A1 | 3/2010 | Ooi et al. | |
| 2010/0088459 A1 | 4/2010 | Arya et al. | |
| 2010/0122030 A1 | 5/2010 | Peters et al. | |
| 2010/0169541 A1 | 7/2010 | Freikorn | |
| 2010/0191922 A1 | 7/2010 | Dickey et al. | |
| 2010/0195243 A1 | 8/2010 | Zhu et al. | |
| 2010/0306551 A1 | 12/2010 | Meyer et al. | |
| 2010/0325352 A1* | 12/2010 | Schuette et al. | 711/103 |
| 2011/0010490 A1 | 1/2011 | Kwon et al. | |
| 2011/0106804 A1 | 5/2011 | Keeler et al. | |
| 2011/0226729 A1 | 9/2011 | Hogg | |
| 2011/0283128 A1 | 11/2011 | Farhan et al. | |
| 2012/0159042 A1 | 6/2012 | Lott et al. | |
| 2012/0170435 A1 | 7/2012 | Trantham | |
| 2012/0275050 A1 | 11/2012 | Wilson et al. | |
| 2012/0281963 A1 | 11/2012 | Krapf et al. | |
| 2012/0290779 A1 | 11/2012 | Eleftheriou et al. | |
| 2012/0317338 A1 | 12/2012 | Yi et al. | |
| 2012/0324980 A1 | 12/2012 | Nguyen et al. | |
| 2013/0024650 A1 | 1/2013 | Ambat et al. | |
| 2013/0117520 A1 | 5/2013 | Ryu | |
| 2013/0173850 A1 | 7/2013 | Song | |
| 2013/0290668 A1 | 10/2013 | Na | |
| 2014/0201424 A1 | 7/2014 | Chen et al. | |

OTHER PUBLICATIONS

Gokul Soundararajan, Vijayan Prabhakaran, Mahesh Balakrishnan, Ted Wobber, "Extending SSD Lifetimes with Disk-Based Write Caches", http://research.microsoft.com/pubs/115352/hybrid.pdf, Feb. 2010.

Tao Xie, Deepthi Madathil, "SAIL: Self-Adaptive File Reallocation on Hybrid Disk Arrays", The 15th Annual IEEE International Conference on High Performance Computing (HiPC 2008), Bangalore, India, Dec. 17-20, 2008.

Non-Volatile Memory Host Controller Interface revision 1.0 specification available for download at http://www.intel.com/standards/nvmhci/index.htm. Ratified on Apr. 14, 2008, 65 pages.

U.S. Appl. No. 12/720,568, filed Mar. 9, 2010, 22 pages.

Hannes Payer, Marco A.A. Sanvido, Zvonimir Z. Bandic, Christoph M. Kirsch, Mar. 2009, "Combo Drive: Optimizing Cost and Performance in a Heterogeneous Storage Device", http://csl.cse.psu.edu/wish2009_papers/Payer.pdf.

Xiaojian Wu, A. L. Narasimha Reddy, Sep. 2009, "Managing Storage Space in a Flash and Disk Hybrid Storage System", http://www.ee.tamu.edu/~reddy/papers/mascots09.pdf.

Boyle, et. al., U.S. Appl. No. 12/824,959, filed Jun. 28, 2010, 21 pages.

Boyle, et. al., U.S. Appl. No. 13/105,800, filed May 11, 2011, 19 pages.

* cited by examiner

HYBRID DRIVE MIGRATING HIGH WORKLOAD DATA FROM DISK TO NON-VOLATILE SEMICONDUCTOR MEMORY

CROSS-REFERENCE TO RELATED APPLICATIONS

The present application claims priority from provisional U.S. Patent Application Ser. No. 61/373,729, filed on Aug. 13, 2010, the specification of which is incorporated herein by reference.

BACKGROUND

Hybrid drives are conventional disk drives augmented with a non-volatile semiconductor memory (NVSM) such as a flash which helps improve certain aspects of the disk drive. For example, the non-volatile semiconductor memory may store boot data in order to expedite the boot operation of a host computer. Another use of a NVSM may be to store frequently accessed data and/or non-sequential data for which the access time is typically much shorter than the disk (which suffers from mechanical latency including seek and rotational latency). Other policies may reduce write amplification of the NVSM in order to maximize its longevity, such as storing frequently written data to the disk (or data having a write/read ratio that exceeds a predetermined threshold).

DETAILED DESCRIPTION OF EMBODIMENTS OF THE INVENTION

Figures 1A, 1B:
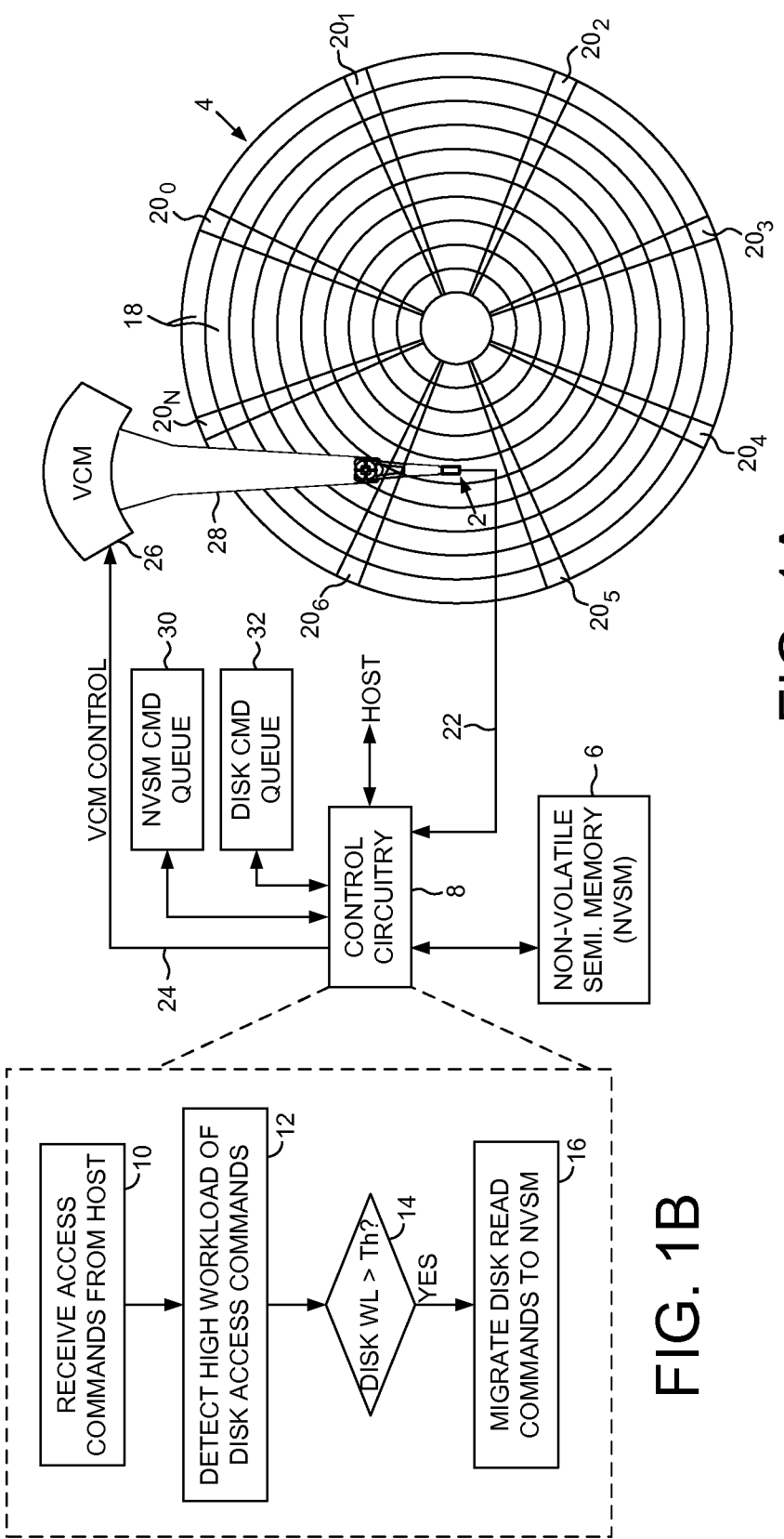
FIG. 1A shows a hybrid drive according to an embodiment of the present invention comprising a head actuated over a disk, and a non-volatile semiconductor memory (NVSM).
FIG. 1B is a flow diagram according to an embodiment of the present invention wherein when a high workload of disk access commands is detected, data of at least one disk read command is migrated to the NVSM.

FIG. 1A shows a hybrid drive according to an embodiment of the present invention comprising a head 2 actuated over a disk 4, and a non-volatile semiconductor memory (NVSM) 6. The hybrid drive further comprises control circuitry 8 operable to execute the flow diagram of FIG. 1B, wherein a plurality of access commands are received from a host (step 10) and evaluated to detect a high workload of disk access commands (step 12). When the high workload of disk access commands is detected (step 14), data of at least one disk read command is migrated to the NVSM (step 16). In the embodiment of FIG. 1A, the disk 4 comprises embedded servo sectors $20_0$-$20_N$ that define data tracks 18 each comprising a number of data sectors. The control circuitry 8 processes a read signal 22 emanating from the head 2 to demodulate the servo sectors $20_0$-$20_N$ and generate a position error signal (PES) representing an error between the actual position of the head and a target position relative to a target track. The control circuitry 8 filters the PES using a suitable compensation filter to generate a control signal 24 applied to a voice coil motor (VCM) 26 which rotates an actuator arm 28 about a pivot in order to actuate the head 2 radially over the disk in a direction that reduces the PES.

Any suitable NVSM 6 may be employed in the embodiments of the present invention such as a suitable flash memory. In one embodiment, the NVSM 6 comprises a plurality of blocks, wherein each block comprises a plurality of memory segments referred to as pages, and each page may store one or more data sectors. The blocks are programmed a page at a time, and an entire block is erased in a unitary operation. In one embodiment, there is a limit to the number of times the blocks of the NVSM may be programmed and erased (referred to as endurance). When the NVSM reaches the limit of program/erase cycles it essentially reaches end of life (for subsequent write operations). Accordingly, in one embodiment of the present invention the NVSM is used sparingly to improve performance, such as when servicing non-sequential access commands, to store frequently read data, or to alleviate the workload on the disk in order to increase throughput.

In one embodiment, the data of access commands are originally mapped to either the NVSM or the disk based on a suitable migration policy. For example, the migration policy may originally map data of non-sequential commands to the NVSM and the data of sequential commands on the disk. When a high workload of disk access commands is detected, the data of one or more of the read commands originally mapped to the disk is migrated to the NVSM in order to alleviate the workload on the disk and increase throughput.

The high workload of disk access commands may be detected in any suitable manner. In one embodiment, the frequency of disk access commands may be used to detect a high workload, for example, when the frequency of disk access commands exceeds a threshold. The frequency may be of the disk access commands, or of the amount of data in the disk access commands. In another embodiment, the control circuitry may generate a NVSM command queue 30 (FIG. 1A) for storing NVSM access commands, and a disk command queue 32 for storing disk access commands. An execution time for the disk access commands in the disk command queue is determined, which may be based on the amount of data in the disk access commands as well as the mechanical latency (seek and rotational latency) required to execute the disk access commands. The high workload may be detected when the execution time for the disk command queue exceeds a threshold.

Figure 2A:
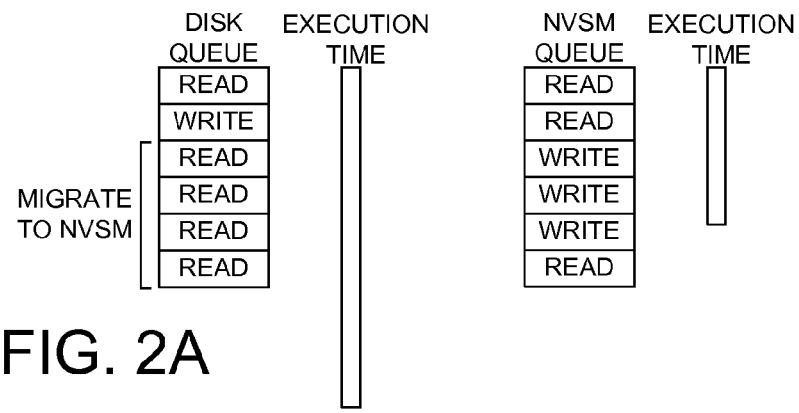
FIG. 2A shows an embodiment of the present invention wherein the high workload of disk access command is determined from the execution time of a disk command queue.
Figure 2B:
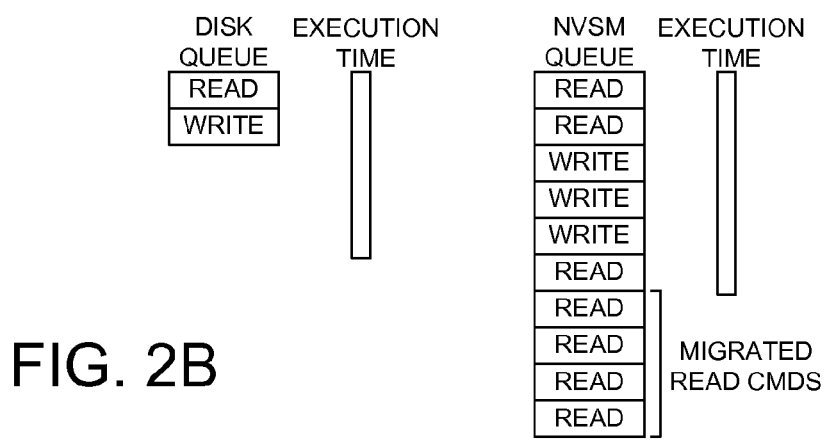
FIG. 2B shows an embodiment wherein after migrating disk read commands to the NVSM, the resulting execution time for the disk command queue is reduced when the command sequence is received again.

FIG. 2A shows an embodiment of the present invention wherein the execution time for the disk command queue indicates a high workload, and therefore a number of the disk read commands pending in the disk command queue are selected for migration to the NVSM. In one embodiment, the migration is carried out by reading the data from the disk, writing the data to the NVSM, and updating mapping information (logical block address (LBA) to physical block address (PBA)) so that the read commands are subsequently serviced by the NVSM. FIG. 2B illustrates the same command sequence received from the host at a later time, wherein the migrated read commands reduce the execution time for the disk command queue. Any number of read commands may be migrated from the disk command queue to the NVSM, and in one embodiment, a number of read commands is selected that balances the execution time for the disk command queue and the NVSM command queue. In one embodiment, the access commands in the disk command queue and the NVSM command queue are executed concurrently so that balancing the execution times maximizes the throughput of the hybrid drive.

Figure 3:
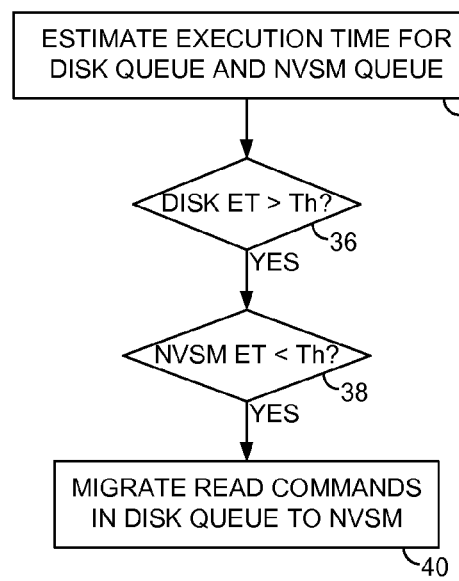
FIG. 3 is a flow diagram according to an embodiment of the present invention wherein data of disk read commands is migrated to the NVSM when the execution time of the disk command queue is greater than a threshold, and the execution time of an NVSM command queue is less than a threshold.

FIG. 3 is a flow diagram according to an embodiment of the present invention wherein an execution time is estimated for the disk command queue and the NVSM command queue (step 34). If the execution time for the disk command queue is greater than a threshold (step 36), and the execution time for the NVSM command queue is less than a threshold (step 38), then the data for at least one read command in the disk command queue is migrated to the NVSM (step 40).

In one embodiment, after migrating the data of a disk read command to the NVSM, the data may be read from either the NVSM or the disk when servicing subsequent read commands. For example, reading the data from the disk may provide better performance if the NVSM is busy servicing other access commands. In another embodiment, the copy of the data stored on the disk can be used as a backup in the event the data stored in the NVSM is unrecoverable.

Figure 4:
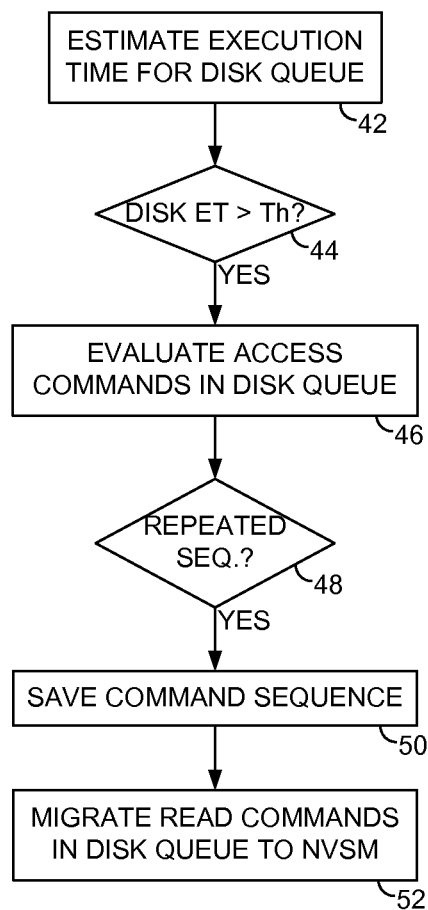
FIG. 4 is a flow diagram according to an embodiment of the present invention wherein data of a repeated command sequence is migrated to the NVSM.

FIG. 4 is a flow diagram according to an embodiment of the present invention wherein the execution time for the disk command queue is estimated (step 42), and when it exceeds a threshold (step 44), the disk access commands in the disk command queue are evaluated to determine whether a command sequence has repeated at least once (step 46). When it is determined that the command sequence is a repeating command sequence (step 48), the command sequence is saved (step 50) and the data for at least one of the disk read commands within the command sequence is migrated to the NVSM (step 52). A repeating command sequence may be detected by evaluating the disk command queue each time the execution time exceeds a threshold, and identifying repeated disk access commands. A command sequence may be repeated, for example, each time a particular application is launched (e.g., in order to read configuration files). Migrating the data of read commands for repeated command sequences to the NVSM improves performance of the hybrid drive, for example, by decreasing application load time.

Figure 5:
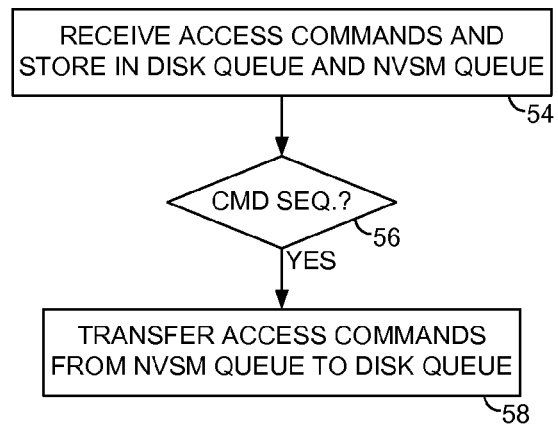
FIG. 5 is a flow diagram according to an embodiment of the present invention wherein when a repeated command sequence is predicted, NVSM access commands are transferred to the disk command queue in order to facilitate the upcoming repeated command sequence.

FIG. 5 is a flow diagram according to an embodiment of the present invention wherein access commands received from the host are stored in the NVSM command queue and the disk command queue (step 54). When a repeated command sequence is predicted to occur (step 56), at least one access command is transferred from the NVSM command queue to the disk command queue (step 58) in order to facilitate the upcoming repeated command sequence. The access commands transferred to the disk command queue may be write commands initially mapped to the NVSM, or read commands initially mapped to the NVSM (if the data is duplicated on the disk).

Figure 6:
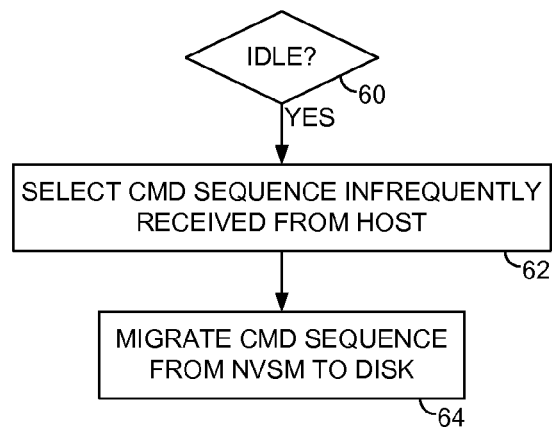
FIG. 6 is a flow diagram according to an embodiment of the present invention wherein during an idle mode the read commands of infrequently received command sequences are migrated from the NVSM back to the disk in order to free up space in the NVSM.

FIG. 6 is a flow diagram according to an embodiment of the present invention wherein when the hybrid drive is idle (step 60) (not servicing access commands) and/or when the remaining free space in the NVSM falls below a threshold, the saved command sequences are evaluated to select a command sequence that is infrequently repeated (step 62). The data of at least one read command in the command sequence is then migrated back to the disk (step 64) in order to free up space in the NVSM. In one embodiment, if a copy of the data is already on the disk, migrating the data from the NVSM to the disk involves merely updating the LBA to PBA mapping. In another embodiment, if the copy of data on the disk has become invalid (e.g., due to a write operation serviced by the NVSM), the valid data stored in the NVSM is copied to the disk in addition to updating the LBA to PBA mapping. In yet another embodiment, data may be migrated to the disk during write operations by writing new data to the disk and invalidating the corresponding old data stored in the NVSM.

Figure 7:
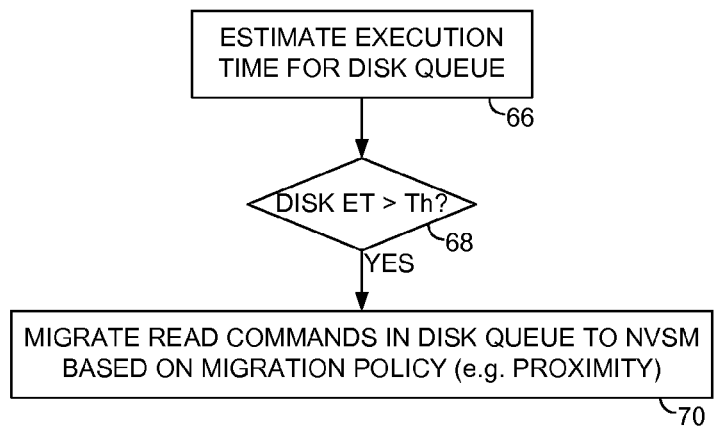
FIG. 7 is a flow diagram according to an embodiment of the present invention wherein data of a disk read command is migrated to the NVSM based on a migration policy.

FIG. 7 is a flow diagram according to an embodiment of the present invention wherein the execution time for the access commands in the command queue is estimated (step 66), and when it exceeds a threshold (step 68), the data of at least one disk read command is migrated to the NVSM based on a migration policy. In one embodiment, the migration policy is similar to the migration policy that initially maps data to either the NVSM or the disk based on parameters such as the sequential/non-sequential nature of the access commands and/or frequency of the access commands. When a high workload of disk access commands is detected, the migration policy parameters are biased so that at least one read command initially mapped to the disk is remapped to the NVSM in order to migrate the data to the NVSM. In another embodiment, the migration policy may be based on a proximity of the data on the disk. For example, near sequential data on the disk may be selected for migration to the NVSM so as to reduce the access latency to other data recorded on the disk. In another embodiment, the data selected for migration may correspond to read commands that minimize access time to other data based on a rotational position optimization (RPO) algorithm. An RPO algorithm attempts to execute the disk access commands in the disk command queue in a sequence that minimizes the access latency (seek and rotation latency). Accordingly, in one embodiment the disk read commands are selected from the disk command queue for migration to the NVSM so that the remaining sequence of disk access commands can be executed with minimal access latency. In yet another embodiment, the migration policy may select data to migrate to the NVSM based on a proximity of LBAs in the disk read commands. For example, sequential or near sequential LBAs may be selected for migration since they are typically associated with individual files accessed by the host.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller and/or NVSM controller, or certain steps described above may be performed by a read channel and others by a disk controller and/or NVSM controller. In one embodiment, the read channel and controllers are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the hybrid drive is powered on. In yet another embodiment, the control circuitry comprises suitable logic circuitry, such as state machine circuitry.

What is claimed is:

1. A hybrid drive comprising:
   a disk;
   a head actuated over the disk;
   a non-volatile semiconductor memory (NVSM); and
   control circuitry operable to:
      receive a plurality of access commands from a host including a plurality of disk access commands and a plurality of NVSM access commands, wherein the disk access commands include a disk read command;
      generate a disk command queue operable to store the disk access commands;
      estimate a first execution time needed to execute the disk access commands in the disk command queue;
      detect a high workload of disk access commands when the first execution time exceeds a first threshold; and
      when the high workload is detected, migrate data of the disk read command to the NVSM because the disk read command is in the disk command queue when the high workload of disk access commands is detected.

2. The hybrid drive as recited in claim 1, wherein the control circuitry is further operable to:
   generate a NVSM command queue operable to store the NVSM access commands;
   estimate a second execution time needed to execute the NVSM access commands in the NVSM command queue; and
   when the first execution time is greater than the first threshold and the second execution time is less than a second threshold, migrate the data of the disk read command in the disk command queue to the NVSM.

3. The hybrid drive as recited in claim 1, wherein the control circuitry is further operable to:
   evaluate the access commands to detect a command sequence executed at least twice when the high workload is detected; and
   when the high workload is detected and the command sequence is detected, migrate the data of the disk read command to the NVSM.

4. The hybrid drive as recited in claim 3, wherein the control circuitry is further operable to:
   evaluate the access commands to predict the command sequence is to occur; and
   when the command sequence is predicted, transfer at least one NVSM access command from an NVSM command queue to the disk command queue.

5. The hybrid drive as recited in claim 3, wherein the control circuitry is further operable to:
   track a frequency that the command sequence is received from the host; and
   when the frequency falls below a threshold, migrate data associated with the command sequence from the NVSM to the disk.

6. The hybrid drive as recited in claim 1, wherein the control circuitry is further operable to migrate the data of the disk read command based on a migration policy.

7. The hybrid drive as recited in claim 6, wherein the migration policy is based on a proximity of the data recorded on the disk.

8. The hybrid drive as recited in claim 6, wherein the migration policy is based on a proximity of logical block addresses (LBAs) in the access commands.

9. A method of operating a hybrid drive comprising a head actuated over a disk, and a non-volatile semiconductor memory (NVSM), the method comprising:
   receiving a plurality of access commands from a host including a plurality of disk access commands and a plurality of NVSM access commands, wherein the disk access commands include a disk read command;
   generating a disk command queue operable to store the disk access commands;
   estimating a first execution time needed to execute the disk access commands in the disk command queue;
   detecting a high workload of disk access commands when the first execution time exceeds a first threshold; and
   when the high workload is detected, migrating data of the disk read command to the NVSM because the disk read command is in the disk command queue when the high workload of disk access commands is detected.

10. The method as recited in claim 9, further comprising:
    generating a NVSM command queue operable to store the NVSM access commands;
    estimating a second execution time needed to execute the NVSM access commands in the NVSM command queue; and
    when the first execution time is greater than the first threshold and the second execution time is less than a second threshold, migrating the data of the disk read command in the disk command queue to the NVSM.

11. The method as recited in claim 9, further comprising:
    evaluating the access commands to detect a command sequence executed at least twice when the high workload is detected; and
    when the high workload is detected and the command sequence is detected, migrating the data of the disk read command to the NVSM.

12. The method as recited in claim 11, further comprising:
    evaluating the access commands to predict the command sequence is to occur; and
    when the command sequence is predicted, transferring at least one NVSM access command from an NVSM command queue to the disk command queue.

13. The method as recited in claim 12, further comprising:
    tracking a frequency that the command sequence is received from the host; and
    when the frequency falls below a threshold, migrating data associated with the command sequence from the NVSM to the disk.

14. The method as recited in claim 9, further comprising migrating the data of the disk read command based on a migration policy.

15. The method as recited in claim 14, wherein the migration policy is based on a proximity of the data recorded on the disk.

16. The method as recited in claim 14, wherein the migration policy is based on a proximity of logical block addresses (LBAs) in the access commands.

\* \* \* \* \*